United States Patent [19]

Driver

[11] Patent Number: 5,411,335
[45] Date of Patent: May 2, 1995

[54] BEARING WITH DUAL RING SEATS

[75] Inventor: Richard C. Driver, Kettering, England

[73] Assignee: The Timken Company, Canton, Ohio

[21] Appl. No.: 88,444

[22] Filed: Jul. 7, 1993

[30] Foreign Application Priority Data

Jul. 9, 1992 [GB] United Kingdom ............... 9214639

[51] Int. Cl.⁶ .............................................. F16C 41/00
[52] U.S. Cl. ..................................... 384/448; 384/446; 310/168
[58] Field of Search ................. 384/99, 565, 571, 569, 384/448, 446; 310/168

[56] References Cited

U.S. PATENT DOCUMENTS

| | | | |
|---|---|---|---|
| 3,939,373 | 2/1976 | Roberts | 310/168 |
| 4,171,495 | 10/1979 | McNinch | |
| 4,795,278 | 1/1989 | Hayashi | |
| 4,884,901 | 12/1989 | Harsdorff | |

FOREIGN PATENT DOCUMENTS

| | | |
|---|---|---|
| 0306850 | 3/1989 | European Pat. Off. |
| 0420041 | 4/1991 | European Pat. Off. |
| 0424185 | 4/1991 | European Pat. Off. |

*Primary Examiner*—Lenard A. Footland
*Attorney, Agent, or Firm*—Polster, Lieder, Woodruff & Lucchesi

[57] ABSTRACT

A bearing for a road wheel of a motor vehicle that is equipped with an anti-lock braking system has on the outer surface of its outer race ring two alternative positions for exciter rings. A rebate affording a cylindrical surface and an axial locating shoulder is provided at each of these positions, enabling a single design of bearing to be used in either a drum or disc brake arrangement.

22 Claims, 1 Drawing Sheet

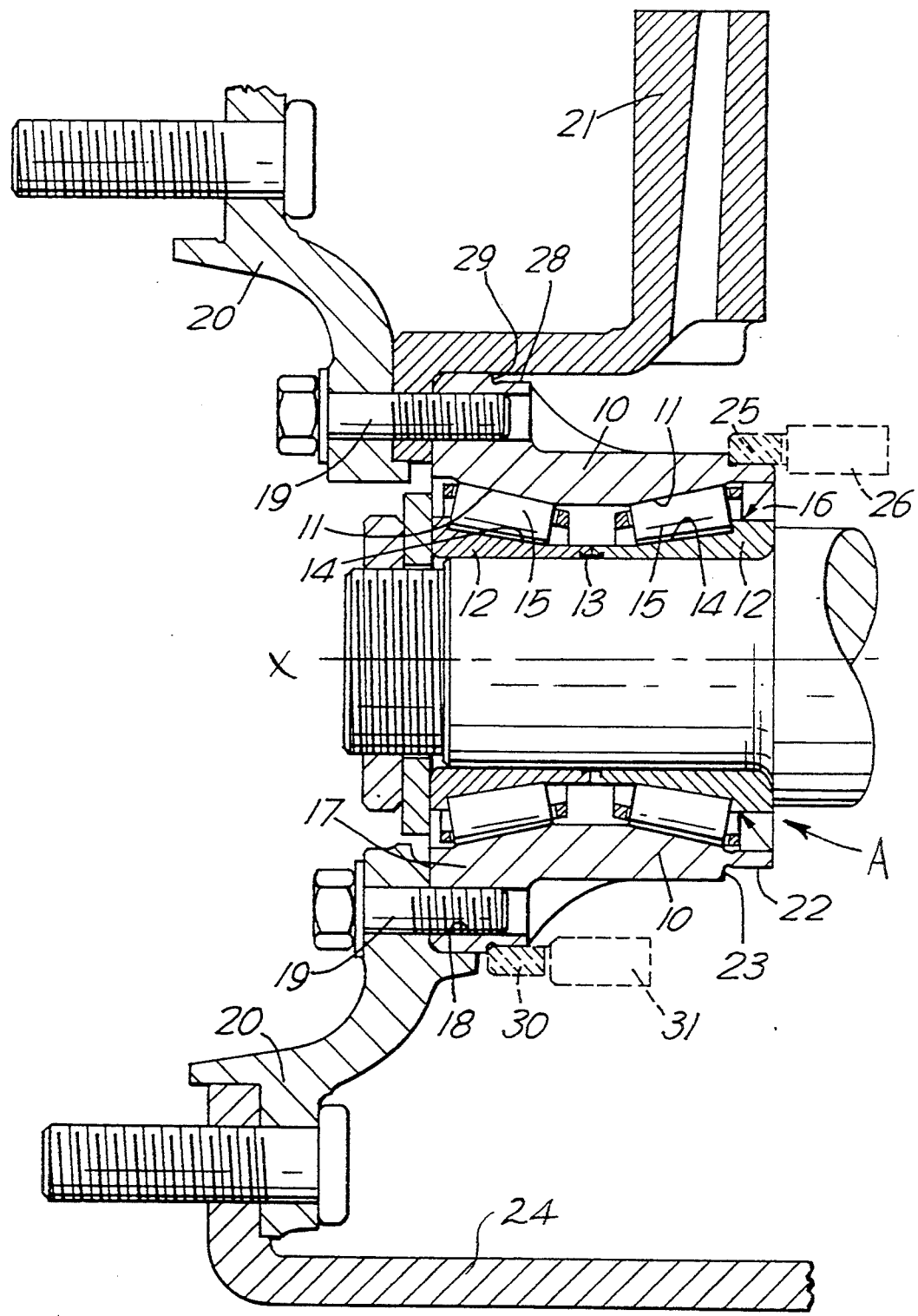

BEARING WITH DUAL RING SEATS

BACKGROUND OF THE INVENTION

This invention relates to bearings and is more particularly concerned with wheel bearings for motor vehicles equipped with anti-lock braking systems.

The present systems of this kind require the provision of an excitor ring on each road wheel or more usually on a component which rotates with the road wheel. In arrangements according to this invention, a bearing assembly is provided for the mounting of the excitor ring.

According to this invention there is provided a wheel bearing for a motor vehicle comprising radially inner and outer race rings and rolling elements in rolling engagement with raceways in said race rings, the outer race ring having at two axially spaced locations on its radially outer surface, each providing an axial and radial location for an excitor ring, thereby to provide two mounting positions for the excitor ring.

The invention also provides a bearing for the wheel of motor vehicle comprising an outer race ring providing one or more radially inwardly facing raceways, an inner race ring or rings providing raceways respectively facing outwardly towards the raceways of the outer race ring, and rolling bearing elements between the raceways of the inner and outer race rings, the outer race ring having at two axially spaced locations on its radially outer surface a cylindrical surface and an axially facing location shoulder at one axial end of each cylindrical surface, the two shoulders facing in the same axial direction and the arrangement being such that an excitor ring can be mounted on either of said cylindrical surfaces.

The invention also provides a bearing arrangement having an outer bearing ring which carries an inwardly presented raceway, an inner bearing ring which is located in the outer ring and carries an outwardly presented raceway, and rolling element located between the raceways of the inner and outer rings such that they roll along the raceways as one ring rotates relative to the other ring; the bearing ring which rotates having two annular seats which are spaced axially apart, either one of which is capable of supporting an excitor ring.

In some constructions according to the invention the outer race ring may be in the form of an annular outer element or hub and an annular inner element or race which is press fitted in the outer element and which provides the radially inwardly facing raceway or raceways, the two said cylindrical surfaces and location shoulder being formed on said outer element.

In a preferred arrangement according to the invention, the outer race ring has an outwardly projecting flange which is adapted to have studs or bolts projecting axially from one axial face thereof and said shoulders face in the opposite axial direction to said axial face. Where the outer race ring comprises outer and inner elements, the flange is formed on the outer element.

DESCRIPTION OF THE DRAWING

The accompanying drawing, which forms part of the specification, shows in compound axial section a bearing assembly according to the invention with excitor rings mounted in the two alternative positions above and below the axis of the bearing respectively.

DETAILED DESCRIPTION

Referring to the drawing, there is shown a wheel bearing A for a road wheel of a motor vehicle equipped with an anti-lock braking system. The bearing A is a two-row tapered roller bearing comprising an outer race ring 10 with raceways 11 inclined away from each other, two inner race rings 12 held in abutment with each other by a clip 13 and having raceways 14 inclined towards each other, and two rows of tapered rollers 15 located between the raceways 11 and 14. A seal 16 is provided at at least one end of the bearing. The outer race ring 10 rotates around the inner race rings 12 about an axis of rotation X, which is the axis of the bearing A, and as it does the rollers 15 roll along the raceways 11 and 14.

The outer race ring 10 is axially thickened at one axial end to form a flange 17 in which threaded holes 18 are machined to receive studs or bolts 19 for the attachment of an annular wheel carrier 20 and brake disc 21 as shown in the upper half of the drawing, or a wheel carrier 20 and brake drum 24 as shown in the lower half of the drawing.

The outer race ring 10 has at its end having the smaller outer diameter a cylindrical surface 22 and a radially directed shoulder 23 at the end of the surface 22 further from that end. As shown in the upper half of the drawing an excitor ring 25, which may be of any convenient form, can be mounted on the surface 22 and located by the shoulder 23 for co-operation with a sensor 26 responsive to the rotational speed of the excitor ring 25. Actually, the sensor 26 detects rotation of the ring 25 and produces a signal which reflects the angular velocity of the ring 25.

Adjacent its larger end the outer race ring 10 has a cylindrical surface 28 and a radially directed shoulder 29 for location of an excitor ring 30 in this alternative position as shown in the lower half of the drawing. In use, a sensor 31 co-operates with the excitor ring 30 and produces a signal which reflects the angular velocity of the excitor ring 30. This arrangement is intended for use with drum brakes.

The two cylindrical surfaces 22 and 28 form seats for their respective excitor rings 25 and 30, whereas the shoulders 23 and 29 locate the rings 25 and 30 axially on those cylindrical surfaces 22 and 28. Typically, the rings 25 and 30 are held on their respective surfaces 22 and 28 with interference fits.

Thus, an excitor ring can be mounted at either position on the outer race ring according to availability of space. There is a requirement to fit disc brakes instead of drum brakes for certain applications where braking efficiency is particularly critical. Space limitations do not permit the excitor ring to be mounted in the same position for both disc and drum brake arrangements, and the illustrated arrangement avoids the need to employ two different bearings.

The outer race ring 10 need not exist as a unitary component, but instead may exist as an outer element in the form of a hub, with the flange 17 and cylindrical surfaces 22 and 28 on it, and inner elements in the form of separate bearing races, which have the raceways 11 on them, pressed into that outer element. The cylindrical surfaces 22 and 28 are machined into the outer race ring 10 with their centers along the axis X.

This invention is intended to cover all changes and modifications of the example of the invention herein chosen for purposes of the disclosure which do not constitute departures from the spirit and scope of the invention.

What is claimed is:

1. A wheel bearing for a motor vehicle comprising: radially inner and outer race rings and rolling elements in rolling contact with raceways in said race rings, the outer race ring having a flange which is directed radially outwardly, the outer race ring also having at two axially spaced locations on its radially outer surface machined surfaces for providing axial and radial locations for an excitor ring, thereby to provide two mounting positions for excitor rings, the machined surfaces being located at one side of the flange.

2. A bearing according to claim 1 and further comprising an excitor ring located firmly on the outer race ring at one of the two axially spaced locations.

3. A bearing according to claim 1 wherein the bearing is a two-row tapered roller bearing.

4. A bearing according to claim 1 wherein the one location for mounting an excitor ring is on the flange.

5. A bearing for the wheel of motor vehicle comprising: an outer race ring providing one or more radially inwardly facing raceways, an inner race ring or rings providing raceways facing outwardly towards the raceways of the outer race ring, and rolling bearing elements located along the raceways of the inner and outer race rings, the outer race ring having at each of two axially spaced locations on its radially outer surface a cylindrical surface and an axially facing location shoulder at one axial end of the cylindrical surface; the two shoulders facing in the same axial direction and the arrangement being such that an excitor ring can be fitted over the outer ring from one end of the ring and mounted on either of said cylindrical surfaces.

6. A bearing according to claim 5 and further comprising an excitor ring on one of the cylindrical surfaces and against the shoulder at the end of that surface.

7. A bearing as claimed in claim 5 wherein the outer race ring has an outwardly projecting flange which is adapted to have studs or bolts projecting axially from one axial face thereof and said shoulders face in the opposite axial direction to said axial face.

8. A bearing according to claim 7 wherein one of the cylindrical surfaces and its shoulder are on the flange.

9. A bearing arrangement for a road wheel of a motor vehicle, said bearing arrangement comprising: an outer bearing ring which carries an inwardly presented raceway; an inner bearing ring located within the outer ring and carrying an outwardly presented raceway that is presented toward the raceway of the outer ring; and rolling elements located between the inner and outer bearing rings and along the raceways such that they roll along the raceways when one of the rings rotates relative to the other ring; the bearing ring which rotates having a radially directed flange and two annular seats which are spaced axially and are separated by an intervening surface, either one of the seats being capable of supporting an excitor ring that has the capacity to excite a sensor located opposite to the ring for producing a signal that reflects the angular velocity of the excitor ring and the rotating bearing ring, the two seats being at the same side of the flange and being spaced axially.

10. A bearing arrangement according to claim 9 and further comprising an excitor ring on one of the seats.

11. A bearing arrangement according to claim 9 wherein the annular seats are of different diameter.

12. A bearing arrangement according to claim 11 wherein the rotatable bearing ring further has shoulders located at the ends of its annular seats for establishing the axial location of an excitor ring that is positioned over either one of the seats.

13. A bearing arrangement according to claim 9 wherein one of the annular seats is on the flange.

14. A bearing arrangement according to claim 9 wherein the outer bearing ring rotates and the annular seats are on the outer ring.

15. A bearing arrangement according to claim 14 wherein the seats are cylindrical and the outer ring further has a shoulder located at the end of each seat and projecting radially outwardly therefrom to axially locate an excitor ring that is on the seat, the shoulders facing in the same axial direction.

16. A bearing arrangement according to claim 9 wherein the outer bearing ring carries two raceways and an inner bearing ring is one of two such rings, one having its raceway presented toward one of the raceways of the outer ring and the other having its raceway presented toward the other raceway of the outer ring.

17. A bearing arrangement according to claim 16 wherein the outer bearing ring rotates and has the flange, and wherein one of the seats is at the end of the outer bearing ring.

18. A bearing arrangement according to claim 17 wherein the other seat is on the flange.

19. A bearing arrangement according to claim 17 wherein said one seat at the end of the outer bearing ring is located in the region of one of the raceways on the outer ring and the other seat surrounds the other raceway of the outer ring.

20. A bearing arrangement according to claim 9 and further comprising a brake component attached to the flange of the rotatable bearing ring, the brake component creating within the region of one of the seats space limitations which prevent the installation of an excitor ring on that seat.

21. A bearing arrangement according to claim 20 and further comprising an excitor ring on the other seat.

22. A bearing arrangement according to claim 21 wherein said one seat at which the space limitations exist is on the flange.

* * * * *